United States Patent [19]
Patterson et al.

[11] Patent Number: 4,997,896
[45] Date of Patent: Mar. 5, 1991

[54] PROCESS AND CATALYST SYSTEM FOR SYNTHESIZING TRANS-1,4-POLYBUTADIENE

[75] Inventors: Dennis B. Patterson, La Jolla, Calif.; Adel F. Halasa, Bath, Ohio

[73] Assignee: The Goodyear Tire & Rubber Company, Akron, Ohio

[21] Appl. No.: 530,129

[22] Filed: May 29, 1990

[51] Int. Cl.$^5$ ............................ C08F 4/28; C08F 2/06
[52] U.S. Cl. .................................. 526/174; 526/173; 526/175; 526/181; 526/335; 502/153
[58] Field of Search ............... 526/173, 175, 181, 335; 502/153, 157

[56] References Cited

U.S. PATENT DOCUMENTS 4,647,635   3/1987   Hall ..................................... 526/181
4,672,097   6/1987   Hall ................................. 526/173 X

*Primary Examiner*—Fred Teskin
*Attorney, Agent, or Firm*—Alvin T. Rockhill

[57] ABSTRACT

Trans-1,4-polybutadiene is a thermoplastic resin rather than a rubber at room temperature by virtue of its high degree of crystallinity. Because trans-1,4-polybutadiene contain many double bonds in its backbone, it can be blended and cocured with rubbers. It is accordingly an attractive alternative to conventional fillers such as carbon black, which are typically utilized in compounding rubber. By utilizing the catalyst system and techniques of this invention, trans-1,4-polybutadiene can be synthesized at a high level of conversion. This invention specifically relates to a process for the synthesis of trans-1,4-polybutadiene by an anionic polymerization process which comprises: (a) adding an alkali metal trialkylmagnesiate and an alkali metal alkoxide as a catalyst system to a polymerization medium containing 1,3-butadiene monomer and an organic solvent; and (b) allowing the 1,3-butadiene monomer to polymerize at a temperature which is within the range of about $-10°$ C. to about $50°$ C. to produce the trans-1,4-polybutadiene.

20 Claims, No Drawings

PROCESS AND CATALYST SYSTEM FOR SYNTHESIZING TRANS-1,4-POLYBUTADIENE

BACKGROUND OF THE INVENTION

Trans-1,4-polybutadiene (TPBD) is a thermoplastic resin by virtue of its high level of crystallinity. Because it contains many double bonds in its polymeric backbone, it can be blended and cocured with rubber. TPBD is similar to syndiotactic-1,2-polybutadiene in this respect.

TPBD is normally prepared utilizing transition metal catalysts or rare earth catalysts. The synthesis of TPBD with transition metal catalysts is described by J. Boor Jr., "Ziegler-Natta Catalysts and Polymerizations", Academic Press, New York, 1979, Chapters 5-6. The synthesis of TPBD with rare earth catalysts is described by D. K. Jenkins, Polymer, 26, 147 (1985). However, molecular weight control is difficult to achieve with such transition metal or rare earth catalysts and monomer conversions are often very modest.

Better molecular weight control could be achieved by utilizing an anionic polymerization system to produce the TPBD. There is typically an inverse relationship between the catalyst level utilized and the molecular weight attained when anionic polymerization systems are used. Such an anionic polymerization system is disclosed in U.S. Pat. No. 4,225,690. The catalyst system disclosed therein is based on a dialkylmagnesium compound which is activated with a potassium alkoxide. However, only a minor amount of the polymer produced with such dialkyl magnesium based catalyst systems is TPBD. In other words, the small amount of TPBD produced utilizing such catalyst systems is always accompanied by major amounts of hexane-soluble polybutadiene of mixed microstructure.

SUMMARY OF THE INVENTION

The present invention relates to a technique for synthesizing TPBD at high levels of conversion by an anionic polymerization process. This anionic polymerization technique is attractive because molecular weight can be controlled by simply varying the catalyst level. It is also attractive because higher molecular weights can be obtained than can be reached utilizing typical coordination catalysts.

The subject invention discloses a catalyst system which can be utilized in the polymerization of 1,3-butadiene monomer into trans-1,4-polybutadiene, said catalyst system being comprised of an alkali metal trialkylmagnesiate and an alkali metal alkoxide, wherein the molar ratio of the alkali metal trialkylmagnesiate to the alkali metal alkoxide is within the range of about 1:1 to about 1:6.

The present invention further discloses a process for the synthesis of trans-1,4-polybutadiene by an anionic polymerization process which comprises polymerizing 1,3-butadiene monomer in an organic solvent at a temperature which is within the range of about −10° C. to about 50° C. in the presence of an alkali metal trialkylmagnesiate and an alkali metal alkoxide.

The present invention more specifically relates to a process for the synthesis of trans-1,4-polybutadiene by an anionic polymerization process which comprises: (a) adding an alkali metal trialkylmagnesiate and an alkali metal alkoxide as a catalyst system to a polymerization medium containing 1,3-butadiene monomer and an organic solvent; and (b) allowing the 1,3-butadiene monomer to polymerize at a temperature which is within the range of about −10° C. to about 50° C. to produce the trans-1,4-polybutadiene.

DETAILED DESCRIPTION OF THE INVENTION

The polymerizations of the present invention will normally be carried out in a hydrocarbon solvent which can be one or more aromatic, paraffinic, or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, normal hexane, benzene, toluene, xylene, ethylbenzene, and the like, alone or in admixture. However, the catalyst systems of this invention can also be used in bulk polymerizations.

In the solution polymerizations of this invention, there will normally be from 5 to 35 weight percent monomers in the polymerization medium. Such polymerization media are, of course, comprised of the organic solvent and 1,3-butadiene monomer. In most cases, it will be preferred for the polymerization medium to contain from 10 to 30 weight percent monomers. It is generally more preferred for the polymerization medium to contain 20 to 25 weight percent monomer.

Polymerization is started by adding an alkali metal trialkylmagnesiate and an alkali metal alkoxide to the polymerization medium. Such polymerizations can be carried out utilizing batch, semi-continuous, or continuous techniques. In a continuous process additional 1,3-butadiene monomer, catalyst, and solvent are continuously added to the reaction vessel being utilized. The polymerization temperature utilized will typically be within the range of about −10° C. to about 50° C. It is normally preferred for the polymerization medium to be maintained at a temperature which is within the range of about 0° C. to about 40° C. throughout the polymerization. It is typically most preferred for the polymerization temperature to be within the range of about 10° C. to about 30° C. The pressure used will normally be sufficient to maintain a substantially liquid phase under the conditions of the polymerization reaction.

The polymerization is conducted for a length of time sufficient to permit substantially complete polymerization of the 1,3-butadiene monomer. In other words, the polymerization is normally carried out until high conversions are realized. The polymerization can then be terminated using a standard procedure.

The alkali metal in the alkali metal trialkylmagnesiate can be lithium, sodium, potassium, rubidium or cesium. Typically the alkali metal will be lithium, sodium or potassium. Potassium and sodium are preferred. The alkyl groups in the alkali metal trialkylmagnesiates will typically contain from 1 to about 14 carbon atoms. More typically, the alkyl group in the trialkylmagnesiate will contain from 2 to about 10 carbon atoms. It is generally preferred for the alkyl groups in the alkali metal trialkylmagnesiate to contain from about 4 to about 8 carbon atoms. Some representative examples of alkali metal trialkylmagnesiates which can be utilized include sodium tributylmagnesiate, sodium tri-2-ethylhexylmagnesiate, sodium tripentylmagnesiate, sodium trihexylmagnesiate, potassium tributylmagnesiate, potassium tri-2-ethylhexylmagnesiate, potassium tripentylmagnesiate and potassium trihexylmagnesiate. The alkali metal in the alkali metal alkoxide can be potassium, rubidium or cesium. It is typically d for the alkali metal to be potassium. The alkali metal alkoxide will typically contain from about 2 to about 12 carbon atoms. It is generally preferred for the alkali metal alkoxide to contain from about 3 to about 8 carbon atoms. It is generally most preferred for the alkali metal alkoxide to contain from about 4 to about 6 carbon atoms. Potassium t-amyloxide (potassium t-pentoxide) is a highly preferred alkali metal alkoxide which can be utilized in the catalyst systems of this invention.

In the catalyst systems of this invention, the molar ratio of the alkali metal trialkylmagnesiate to the alkali metal alkoxide will typically be within the range of about 1:1 to about 1:6. It is generally preferred for the molar ratio of the alkali metal trialkylmagnesiate to the alkyl metal alkoxide to be within the range of about 1:2 to about 1:4. Molar ratios within the range of about 2:5 to about 2:7 are most preferred. The amount of catalyst employed will be dependent upon the molecular weight which is desired for the TPBD being synthesized. As a general rule with all anionic polymerizations, the molecular weight of the polymer produced is inversely proportional to the amount of catalyst utilized. As a general rule, from about 0.1 to about 4 phm (parts per hundred parts of monomer by weight) of the alkali metal trialkylmagnesiate will be employed. In most cases, it will be preferred to utilize from about 0.5 to about 2 phm of the alkali metal trialkylmagnesiate.

In the TPBD produced by the process of this invention, at least 75% of the butadiene repeat units in the polymer are of the trans-1,4-isomeric structure. The TPBD made utilizing the catalyst system of this invention typically has a trans-isomer content of about 80% to about 95%. The TPBD produced has two distinct melting points. The first melting point is within the range of about 60° C. to about 80° C. and the second melting point is within the range of about 135° C. to about 155° C.

This invention is illustrated by the following examples which are merely for the purpose of illustration and are not be regarded as limiting the scope of the invention or the manner in which it can be practiced. Unless specifically indicated otherwise, all parts and percentages are given by weight.

EXAMPLE 1

Potassium tributylmagnesiate was prepared from potassium metal and dibutylmagnesium using a procedure adapted from D. B. Malpass and J. F. Eastham, J. Org. Chem., 38, 3718 (1973). An 8 ounce (236 ml) septum-sealed (Viton A gasket) screw-cap bottle fitted with a metal safety shield and containing 100 ml of 1.11 M dibutylmagnesium in heptane (this solution was obtained from Lithco) and 4.5 g of potassium metal was tumbled in a rotary bath at 69° C. for seven hours. At room temperature the bottle contents were transferred under nitrogen atmosphere to a fritted filter using a double-tipped needle. Dry hexane was used to rinse all the solid onto the frit and to wash it. Two portions of dry benzene, 50 and 30 ml respectively, were then used to carry benzene-soluble material through the frit, yielding a benzene solution of the product. This solution was transferred to a septum-sealed "pop" bottle and stored at −10° C. for use directly in polymerizations.

EXAMPLE 2

A dry, nitrogen-filled 32 ounce (946 ml) septum sealed screw cap bottle was charged with 800 ml of an 18% solution of butadiene in mixed hexanes. This solution had been passed several times over mixed silica/alumina under nitrogen atmosphere. 0.50 ml of 0.92 M potassium t-pentoxide in cyclohexane (obtained from Callery Chemical Company and treated with potassium metal) was injected into the bottle with a syringe. Then, 0.20 ml of the potassium tributylmagnesiate in benzene prepared in Example 1 was injected into the bottle.

The bottle was placed in a rotary bath at 10° C. and tumbled for 24 hours. The bottle was shortstopped with 10 ml of methanol and 15 ml of a 5% w/v solution of butylated hydroxytoluene (BHT) in hexane. The trans-1,4-polybutadiene resin was strained off and washed several times with hexane, the final wash (with soaking) being with 1% w/v BHT in hexane.

The weight of recovered trans-1,4-polybutadiene was 93.2 grams, essentially 100% of the butadiene (93.6 grams at a density of 0.65 for the butadiene/hexane solution). A DSC trace of the material showed a melting point of 150–151° C., indicating it to be of very high trans-1,4 content. In other, similar polymerizations, lower yields of trans-1,4-polybutadiene were obtained, sometimes accompanied by substantial hexane-soluble polybutadiene. Such results are ascribed to impurities which may (1) destroy the catalyst which produces trans-1,4-polybutadiene or (2) convert this catalyst into catalyst(s) which produce hexane-soluble polybutadiene. Rigorous purification of reagents and apparatus is extremely important and absolutely necessary to obtain good yields of trans-1,4-polybutadiene.

EXAMPLE 3

A dry, nitrogen filled 8 ounce (236 ml) septum sealed screw cap bottle was charged with 200 ml of the butadiene/hexane solution used in Example 2. 0.125 ml of 0.92 M potassium t-pentoxide (per Example 2) was injected into the bottle with a syringe. Subsequently, 0.10 ml of sodium trialkylmagnesiate, 0.47 M Mg in methylcyclohexane/heptane (which was obtained from Litcho) was injected into the bottle.

The bottle was transferred to a rotary water bath at 10° C. and tumbled for 72 hours. The bottle was shortstopped with methanol and 5% w/v BHT/hexane as in Example 2 (proportionate amounts). The trans-1,4-poly(butadiene) weighed 20.2 grams or 86% of the starting butadiene (23.4 grams).

While certain representative embodiments and details have been shown for the purpose of illustrating the present invention, it will be apparent to those skilled in this art that various changes and modifications can be made therein without departing from the scope of the present invention.

What is claimed is:

1. A catalyst system which can be utilized in the polymerization of 1,3-butadiene monomer into trans-1,4-polybutadiene, said catalyst system being comprised of an alkali metal trialkylmagnesiate and an alkali metal alkoxide, wherein the molar ratio of the alkali metal trialkylmagnesiate to the alkali metal alkoxide is within the range of about 1:1 to about 1:6, and wherein the alkali metal in the alkali metal alkoxide is selected from the group consisting of potassium, rubidium and cesium.

2. A catalyst system as specified in claim 1 wherein the alkali metal in the alkali metal trialkylmagnesiate is selected from the group consisting of lithium, sodium, and potassium.

3. A catalyst system as specified in claim 2 wherein the molar ratio of the alkali metal trialkylmagnesiate to the alkali metal alkoxide is within the range of about 1:2 to about 1:4.

4. A catalyst system as specified in claim 3 wherein the alkali metal in the alkali metal alkoxide is potassium.

5. A catalyst system as specified in claim 3 wherein the alkyl groups in the alkali metal trialkylmagnesiate contain from about 2 to about 10 carbon atoms.

6. A catalyst system as specified in claim 5 wherein the alkali metal alkoxide contains from about 3 to about 8 carbon atoms.

7. A catalyst system as specified in claim 3 wherein the alkyl groups in the alkali metal trialkylmagnesiate contain from about 4 to about 8 carbon atoms.

8. A catalyst system as specified in claim 7 wherein the alkali metal alkoxide contains from about 4 to about 6 carbon atoms.

9. A catalyst system as specified in claim 3 wherein the alkali metal alkoxide is potassium t-pentoxide.

10. A catalyst system as specified in claim 9 wherein the alkali metal trialkylmagnesiate is potassium tributylmagnesiate.

11. A catalyst system as specified in claim 8 wherein the molar ration of the alkali metal trialkylmagnesiate to the alkali metal alkoxide is within the range of about 2:5 to about 2:7.

12. A process for the synthesis of trans-1,4-polybutadiene by an anionic polymerization process which comprises polymerizing 1,3-butadiene monomer is an organic solvent at a temperature which is within the range of about −10° C. to about 50° C. in the presence of an alkali metal trialkylmagnesiate and an alkali metal alkoxide, wherein the alkali metal in the alkali metal alkoxide is selected from the group consisting of potassium, rubidium and cesium.

13. A process as specified in claim 12 wherein the polymerization is carried out at a temperature which is within the range of about 0° C. to about 40° C.

14. A process as specified in claim 12 wherein the molar ration of the alkali metal trialkylmagnesiate to the alkali metal alkoxide is within the range of about 1:1 to about 1:6.

15. A process as specified in claim 14 wherein the alkyl groups in the alkali metal trialkylmagnesiate contain from about 4 to about 8 carbon atoms and wherein the alkali metal alkoxide contains from about 3 to about 8 carbon atoms.

16. A process as specified in claim 13 wherein the alkali metal alkoxide is potassium t-pentoxide.

17. A process as specified in claim 16 wherein the alkali metal trialkylmagnesitae is potassium tributylmagnesiate.

18. A process for the synthesis of trans-1,4-polybutadiene by an anionic polymerization process which comprises: (a) adding an alkali metal trialkylmagnesiate and an alkali metal alkoxide as a catalyst system to a polymerization medium containing 1,3-butadiene monomer and an organic solvent, wherein the alkali metal in the alkali metal alkoxide is selected from the group consisting of potassium, rubidium and cesium; and (b) allowing the 1,3-butadiene monomer to polymerize at a temperature which is within the range of about −10° C. to about 50° C. to produce the trans-1,4-polybutadiene.

19. A process as specified in claim 18 wherein the polymerization is conducted at a temperature which is within the range of about 0° C. to about 40° C.

20. A process as specified in claim 18 wherein the polymerization is conducted at a temperature which is within the range of about 10° C. to about 30° C.

* * * * *